W. NELSON & C. O. CHURCHILL.
VALVE.
APPLICATION FILED JULY 9, 1909.

953,100.

Patented Mar. 29, 1910.
2 SHEETS—SHEET 1.

WITNESSES:
A. Crocheron
R. Menk

INVENTORS
William Nelson
Charles O. Churchill
BY
Alan M. Johnson
ATTORNEY

W. NELSON & C. O. CHURCHILL.
VALVE.
APPLICATION FILED JULY 9, 1909.
953,100.
Patented Mar. 29, 1910.
2 SHEETS—SHEET 2.
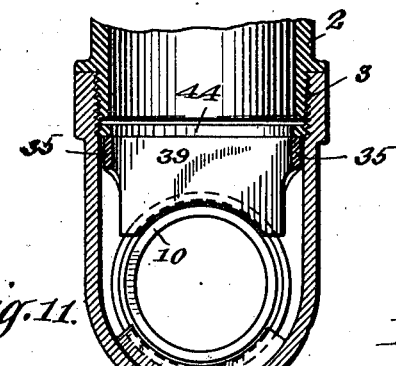
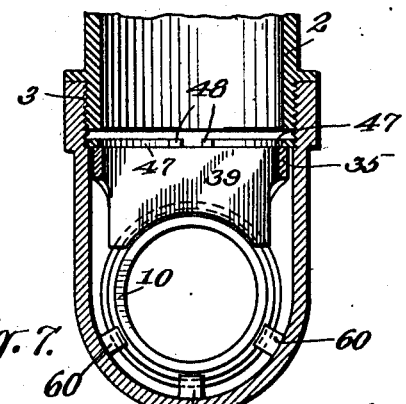
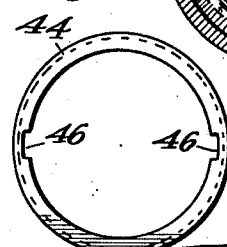
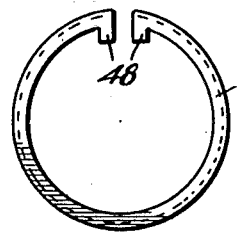
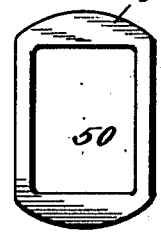
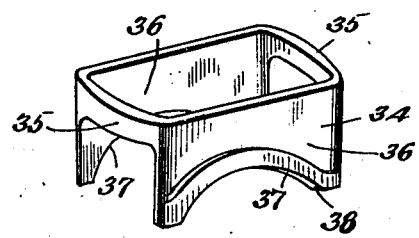
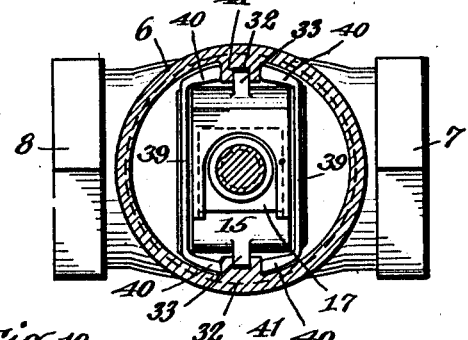
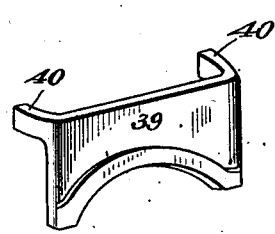
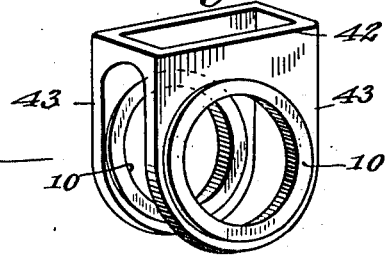
WITNESSES:
H. Crocheron
R. Menk
INVENTORS
William Nelson
Charles O. Churchill
BY
Alan M. Johnson
ATTORNEY

UNITED STATES PATENT OFFICE.

WILLIAM NELSON AND CHARLES O. CHURCHILL, OF BINGHAMTON, NEW YORK, ASSIGNORS TO THE GEORGIAN MANUFACTURING COMPANY, OF BINGHAMTON, NEW YORK, A CORPORATION OF NEW JERSEY.

VALVE.

953,100.  Specification of Letters Patent.  Patented Mar. 29, 1910.

Application filed July 9, 1909.  Serial No. 506,686.

*To all whom it may concern:*

Be it known that we, WILLIAM NELSON and CHARLES O. CHURCHILL, citizens of the United States, and residents of Binghamton, in the county of Broome and State of New York, have invented certain new and useful Improvements in Valves, of which the following is a specification, taken in connection with the accompanying drawings, which form a part of the same.

This invention relates to valves and more particularly to the internal mechanism of such valves.

Figure 1:
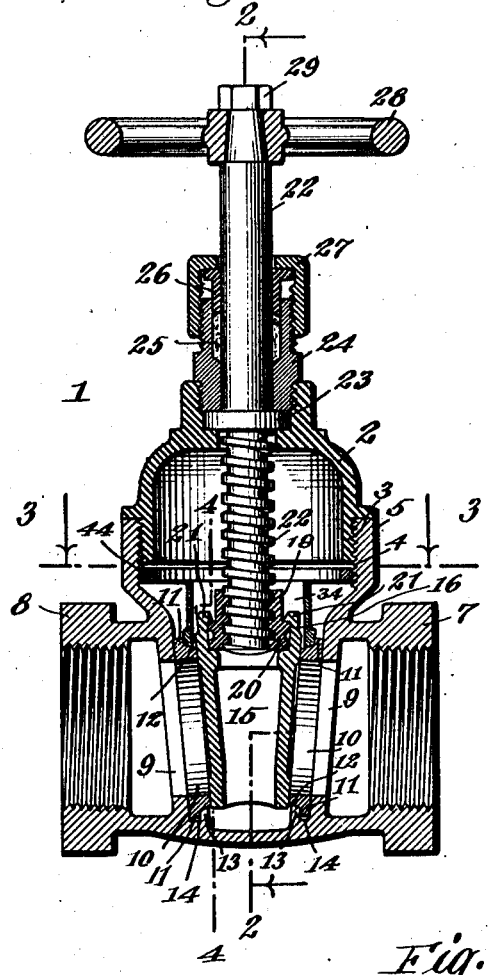
Figure 2:
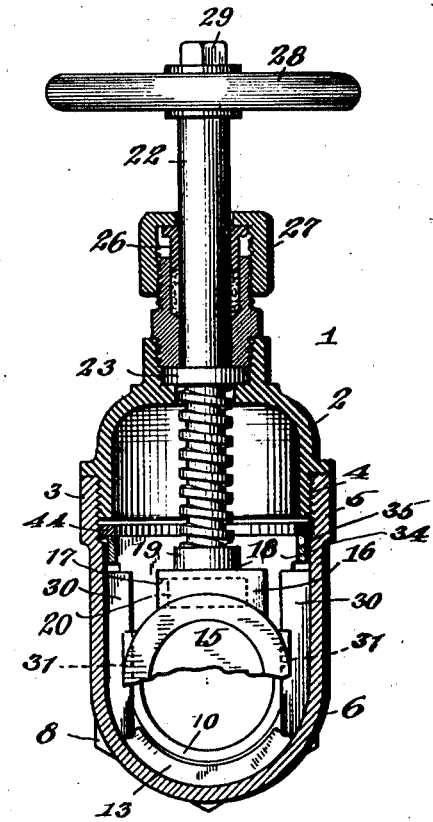
Figure 3:
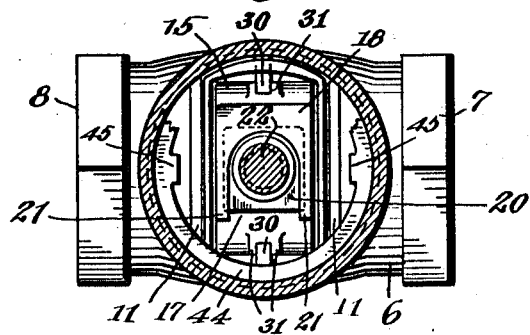

In the accompanying drawings showing illustrative embodiments of this invention and in which the same reference numerals refer to the similar parts in the several figures,—Figure 1 is a vertical section of our improved valve showing the wedge or gate closed; Fig. 2 is a vertical section at right angles to the section shown in Fig. 1 and substantially on line 2—2 of said figure, looking in the direction of the arrows; Fig. 3 is a horizontal section on the line 3—3 of Fig. 1, looking down in the direction of the arrows, a portion of the locking ring being broken away for purposes of better illustration; Fig. 4 is a vertical section on substantially line 4—4 of Fig. 1, looking in the direction of the arrows; Fig. 5 is a detail perspective view of one form of cage; Fig. 6 is a detail vertical section showing a modified form of construction; Fig. 7 is a plan view of a modified form of locking ring; Fig. 8 is a horizontal section showing a modified form of cage and guiding means for the wedge or gate; Fig. 9 is a detail perspective view of a portion of the cage shown in Fig. 8; Fig. 10 is a perspective view of another form of cage; Fig. 11 is a plan view of a locking ring provided with recesses instead of lugs; Fig. 12 is a plan view of still another form of locking member.

In the illustrative embodiments of this invention shown in the drawings, 1 is a valve of any suitable construction. For purposes of illustration it is shown of the stationary spindle type, though of course it is to be understood that a rising spindle could be used if desired, and that a type of valve may be used in which the bonnet is bolted instead of screwed to the body portion. These are details of selection or adaptation which do not enter into our invention and therefore only one form of valve operating mechanism is illustrated.

We have shown our invention, as noted, applied to a valve provided with a bonnet 2 which has a downwardly extending flange 3 provided with screw threads to coöperate with screw threads 4 upon the arm 5 of the body member 6. This body member 6 is shown provided with two other arms 7 and 8 respectively, which are suitably tapped for the reception of pipes, all as well known in the art. The body portion is also provided with valve seats 9, 9, and each valve seat is provided with a seat ring 10 having an internal diameter substantially that of the valve seats 9, 9. These seat rings may be formed of any suitable material such as asbestos, hard rubber, leather or combinations of the same, or may be made from any suitable metal or alloys of any metal, all as found convenient or expedient. These seat rings may be given different contours, but preferably we provide them with a flange 11, and with an external inclined or bevel surface 12.

Various means may be used to hold the seat rings 10, 10 to the valve seats 9, 9. For instance concave lugs 13, 13 may be formed in the body member, Figs. 1, 2 and 4, preferably, though not necessarily, being cast integral with the body member 6 at a sufficient distance from the valve seats 9, 9 to form recesses 14 within which the flanges 11, 11 of the seat rings 10, 10 snugly fit.

Various forms of gates or wedges, to coöperate with the seat rings 10, 10 may be employed. For purposes of illustration, though our invention it is to be understood is not to be limited to such a specific form, we use a gate or wedge 15 provided with a head 16 having the crown 18 partially open for the reception of a nut 19, having a head 20 adapted to be forced through the open side 17 of the head 16. This head is provided with inwardly projecting shoulders 21 to engage with the head 20 of the nut 19. This arrangement insures the connection between the nut 19 and the wedge or gate 15, but the connection is such that the parts can be readily disconnected when desired, by slipping the nut 19 laterally out of the crown 18 and through the open side 17 of the head 16. This nut 19 coöperates with a screw threaded spindle 22, which in the form shown is a non rising spindle, or as known in this art is a "stationary" one, being provided with a flange 23 held to the bonnet 2 by means of a screw threaded thimble 24 which is also provided at its upper end with a recess for any suitable packing 25 and a bushing 26, both of which are held in place by means of an internal screw threaded cap 27. The upper end of the spindle 22 is provided with a hand wheel 28 secured to the spindle in any suitable manner such as by a nut 29.

To insure the proper movement of the wedge or gate we use a suitable guiding mechanism. Such guiding mechanism may be of various forms; the preferred construction being inwardly extending ribs 30, 30 which are secured to the body member 6 in any suitable manner but preferably cast integral with it. These ribs coöperate with the recesses 31, 31 formed on opposite sides of the gate or valve 15, see Fig. 3 and also dotted lines on Fig. 2. It is to be understood, however, that this arrangement may be reversed such as shown in Fig. 8, where the body member is shown provided with grooves 32, 32 in the guides 41, 41, within which operate the lugs or projections 33, 33 carried by the wedge or gate 15.

It is very essential in this type of valve to insure that the removable seat rings 10, 10 be held firmly and securely to the body member 6 and that the means for holding the seat rings be independent of the bonnet 2. In our invention we use a holding member or cage which may be given various shapes to hold the seat rings 10, 10 and we lock the cage to the body member 6 by some suitable locking element which is independent of and distinct from the bonnet 2. It will therefore be readily seen that by such a construction the seat rings are securely held in place even when the bonnet and wedge are removed, which in practice is found to be of great advantage.

In the preferred form, the lower portion of the flanges 11 of the seat rings 10, 10 fit in the recesses 14, 14. These recesses 14, 14 are preferably of sufficient depth and extend sufficiently up the side of the body member 6 to hold the seat rings 10, 10 in place even when the axis of the valve with reference to the pipe line is vertical. Furthermore, it is not essential that the lugs 13, 13 be continuous. They may be formed of a plurality of smaller lugs 60, 60 as shown in Fig. 6. The upper portions of the flanges 11, 11 coöperate with a cage or holding member 34, such for instance as Fig. 5. In the preferred construction this cage consists of a substantially rectangular member having curved ends 35, 35 and downwardly extending concave legs 36, 36, the curvature of these legs being such as to snugly fit the upper portion of the seat rings 10, 10. We also preferably, though not necessarily, form the concave surfaces 37, 37 of the legs 36, 36 beveled, as at 38, to coöperate with the bevel or incline surfaces 12 on the seat rings 10, 10, the bevels being such that any downward pressure upon the cage 34 will cause the bevel surfaces 38 of the concave surfaces 37 to tend to move downward on the inclined or beveled surface 12 of the seat rings 10, 10, which will more firmly press the rings against their seats 9, 9 in an obvious manner.

Various other forms of cages may be used, such for instance as shown in Figs. 8 and 9, where the cage is formed of two members 39, 39 having arms 40, 40 which are adapted to take on opposite sides of the guides 41, 41 which are secured to the body member 6, preferably, though not necessarily, by being cast integral with it. In this form the cage is made of two members 39, 39 each of which contacts with one of the seat rings and is held in its operative position by the same locking element or ring that is used to lock the preferred form of cage to the body member 6.

In some instances we may use a cage 42 provided with downwardly extending ears 43, 43, Fig. 10, in which are carried the seat rings 10, 10.

In all forms of our device the cage or holding member, whether it be such a cage as 34 or 39 or 42, or any variation or equivalent of them, is securely held in place in the body member 6, by means of some locking element which is separate and distinct from the bonnet 2, or its equivalent. In the preferred construction, to which our invention is not to be limited, this locking element is in the form of a locking ring 44 provided with screw threads to coöperate with the screw threads 4 in the arm 5 of the body member 6. This ring 44 may either be provided with lugs 45, 45 Fig. 3, or recesses 46, 46, Fig. 11, to coöperate with any spanner or tool which will cause it to lock the cage to the body member 6 irrespective of the bonnet 2, as shown for instance in Figs. 1, 2, 3 and 4. This locking member may be formed in many other ways. For instance, it may be formed as a split locking ring 47, Figs. 6 and 7, having for instance inwardly extending lugs 48, 48 which may be pressed together with any suitable tool to permit it to be withdrawn from the screw threads of the arm 5. In some instances it may be found desirable to form this locking member in the form of a flat spring 49, preferably, though not necessarily, made of metal, such for instance as shown in Fig. 12. This spring is provided with an opening 50 to permit the passage of the wedge with its spindle.

In all these different forms, it will be seen that in accordance with our invention, the seat rings 10, 10 are readily removable and can be easily replaced in their operative position and that the locking element, of whatever shape it may be formed, securely holds the cage and the seat rings to the body member 6, irrespective of the bonnet; and that the withdrawal of the bonnet and wedge or gate does not affect the adjustment or the position of the seat rings.

Having thus described this invention in connection with the several illustrative embodiments thereof to the details of which we do not desire to be limited, what is claimed as new and what it is desired to secure by Letters Patent is set forth in the appended claims.

1. In a valve the combination of a valve body provided with a recess, a bonnet, a seat ring provided with an annular flange to coöperate with the recess in the valve body, a cage to coöperate with the seat ring, and independent means to removably lock the seat ring to the body member irrespective of the bonnet.

2. In a valve, the combination of a valve body provided with a recess, a bonnet, a seat ring provided exteriorly with a flange and an inclined surface to coöperate with the recess in the valve body, a cage provided with an inclined surface to coöperate with the inclined surface of the seat ring, and elastic means to removably lock the seat ring to the body member irrespective of the bonnet.

3. In a valve, the combination of a valve body provided with a recess, a bonnet, a seat ring provided with an annular flange to coöperate with the recess in the valve body, a cage to coöperate with the seat ring, and a separate locking ring coöperating with the cage to removably hold the cage to the body member.

4. In a valve, the combination of a valve body provided with a recess, a bonnet, a seat ring provided exteriorly with a flange and an inclined surface to coöperate with the recess in the valve body, a cage provided with an inclined surface to coöperate with the inclined surface of the seat ring, and a locking ring coöperating with the cage to removably hold the cage to the body member.

5. In a valve mechanism, the combination of a body member provided with valve seats substantially in one plane, concave ribs secured to the body member and spaced from the respective valve seats, removable seat rings provided with a flange to fit in the recesses between the concave ribs and the valve seats and to lie snugly against the valve seats, a cage to coöperate with the removable valve seats, a locking member coöperating with the cage to hold the cage with its removable seat rings to the body member, a bonnet, a wedge or gate, and means to operate the wedge or gate.

WILLIAM NELSON.
C. O. CHURCHILL.

Witnesses:
ARTHUR J. RULAND,
F. G. KELLEY.